United States Patent [19]

Davis et al.

[11] 4,267,306
[45] May 12, 1981

[54] POLYESTER POLYMERS CONTAINING RESIDUES OF ANTHROQUINONE DYES

[75] Inventors: Thomas G. Davis; Max A. Weaver, both of Kingsport, Tenn.

[73] Assignee: Eastman Kodak Company, Rochester, N.Y.

[21] Appl. No.: 12,415

[22] Filed: Feb. 15, 1979

[51] Int. Cl.³ .................................... C08G 63/68
[52] U.S. Cl. .............................. 528/226; 260/372; 260/373; 260/377; 260/380; 528/220; 528/228; 528/229; 548/265
[58] Field of Search ............... 528/220, 228, 229, 226; 548/265; 260/372, 373, 377, 380

[56] References Cited

U.S. PATENT DOCUMENTS 4,116,923  9/1978  Gattner et al. .................... 528/220

Primary Examiner—Lester L. Lee
Attorney, Agent, or Firm—Donald W. Spurrell; Daniel B. Reece III

[57] ABSTRACT

Disclosed are anthraquinone dyes useful in conventional dyeing of synthetic fibers and for incorporation by copolymerization into polyesters for coloring the same, said dyes having the structure

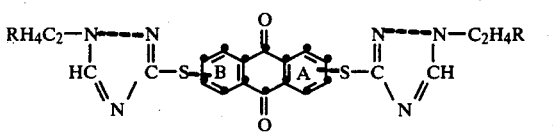

-continued
and

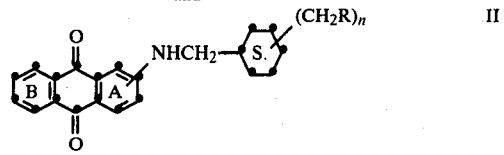

wherein R is —OH, —COOR¹, or —COX wherein R¹ is —H or a radical such as lower alkyl which may be used in polyester forming condensation reactions, X is halogen, preferably Cl or Br, n is 1 or 2, either A or B of II must contain, and A or B of I may contain, at least one additional

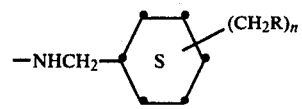

group, and each of rings A and B may be substituted with 1-3 radicals such as lower alkyl, cycloalkyl, lower alkoxy, chlorine, bromine, amino, lower alkyl amino, substituted lower alkyl amino, aryl amino, lower alkylsulfonyl, lower alkylthio, arylthio, and the like. The term "lower" as used herein means 1-6 carbons. These dyes can be used for conventional dyeing of a variety of fibers including polyester, polyamide, and cellulose ester, in addition to dyeing polymers by incorporation into the molecule, and are particularly useful for imparting red to greenish-blue shades to polyester plastics materials such as bottles when employed in the proper combinations.

6 Claims, No Drawings

POLYESTER POLYMERS CONTAINING RESIDUES OF ANTHROQUINONE DYES

This invention concerns anthraquinone dyes having functional groups, and particularly as reacted thereby into linear saturated or unsaturated crosslinkable polyesters to impart color thereto. The dyes are thermally stable at the polymer processing temperatures and are colorfast and nonextractable from the polymer. Polymers containing these dyes may be used, for example, to mold beverage bottles.

The dyes of this invention have the structure

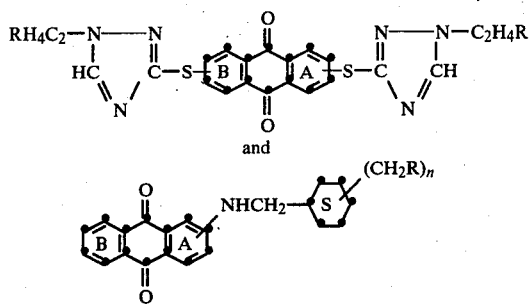

wherein R is —OH, —COOR$^1$ or —COX wherein R$^1$ is —H or a radical such as lower alkyl which may be used in polyester forming condensation reactions, X is halogen, n is 1 or 2, and either A or B of II must contain, and A or B of I may contain, at least one additional

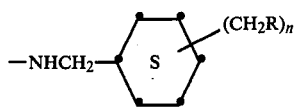

group. Each of rings A and B may be further substituted with 1–3 radicals such as lower alkyl which may be substituted with lower alkoxy, phenyl, Cl, Br, and lower alkanoylamino; lower alkoxy which may be substituted with lower alkoxy, phenyl, Cl, Br, and lower alkanoylamino; chlorine; bromine; amino; lower alkyl amino which may be substituted with lower alkoxy, cyclohexyl, phenyl, Cl, Br, and lower alkanoylamino; aryl amino; arylthio; and aroylamino; wherein each aryl is 6–10 carbons and preferably phenyl in each case; lower alkylsulfonyl; lower alkylthio; lower alkanoylamino; cyclohexylamino; and the like.

The present dyes can also be used, e.g., in conventional exhaust dyeing of a variety of fibers including polyester, polyamide, and cellulose ester, in addition to dyeing polymers by incorporation into the molecule. The dyes have excellent heat stability and resistance to fading by light, and also exhibit good wash and crock fastness, build, leveling, pH stability, dye bath exhaustion rate, gas fastness, and the like on synthetic fibers, particularly polyester. Brightly colored polymers can be obtained by copolymerization with one or more of the dyes, which polymers can be blown into bottles and/or molded into many useful articles. Practically any color can be obtained with the proper combination of blue, red, and yellow dyes of this type, and, if desired, other known pigments, fillers and the like may be admixed with the polymers to give the effects needed.

The dyes of formula II of this invention are in general prepared by reacting anthraquinone intermediates containing labile groups such as halogen, hydroxyl, nitro, sulfonic acid, phenoxy, or the like with aminomethylcyclohexane methanol. The intermediate amine may be either 2, 3 or 4-aminomethylcyclohexane methyl derivatives such as methanol or mixtures thereof, and a mixture of cis and trans isomers may be utilized. The following procedures illustrate the preparative methods:

EXAMPLE 1

Preparation of 1,5-Bis[[[4-(hydroxymethyl)-cyclohexyl]-methyl]amino]anthraquinone A mixture of 1,5-dichloroanthraquinone (77.6 g), trans-4-aminomethylcyclohexane methanol (180 g), methyl cellosolve (280 ml), and potassium carbonate (38.7 g) was stirred and heated at reflux for about eight hours. The mixture was cooled below 100° C. and hot water (350 ml) was added. The dye was collected by filtering at about 80° C. and washed with methanol and then water. The moist cake was slurried in methyl cellosolve (500 ml) and the mixture heated to reflux. After cooling to room temperature, the dye was collected by filtration, washed with acetone, and finally with water. The yield of red dye was 110 g or about 80% of the theoretical yield.

EXAMPLE 2

Preparation of 1,4-Bis[[[4-(hydroxymethyl)cyclohexyl]-methyl]amino]anthraquinone A mixture of quinizarin (37.5 g) and lecuoquinizarin (12.5 g) was added portionwise over about one hour to trans-4-aminomethylcyclohexane methanol (200 g) at 125°–130° C. The temperature was held at 125°–130° C. for an additional two hours and then the reaction mixture was added with stirring to a 2% aqueous sodium hydroxide solution (800 ml). Air and steam were blown through the mixture for about one hour and then the dye was collected by filtration and washed with water. The moist cake was slurried in isopropanol (250 ml) at 55°–60° C. and the mixture was then filtered. The dye cake was washed with acetone and then dried in air. The yield was 78 g or about 77% of the theoretical yield.

Further detail concerning procedures for preparation of anthraquinone compounds similar to the above may be found in the following books: H. A. Lubs, "The Chemistry of Synthetic Dyes and Pigments", Reinhold Publishing Corporation, New York, 1955, pp 337–550; H. Fierz-David and L. Blangey, "Fundamental Processes of Dye Chemistry", Interscience Publishers, Inc., New York, 1949, pp. 224–348. The dyes of formula I are disclosed and claimed in U.S. Pat. No. 3,689,501 and this patent may be referred to for specific details regarding preparation thereof.

EXAMPLE 3

Preparation of Copolymer Containing Copolymerized Red Dye (The ppm is based on one million parts of the total polymer)

145.5 g (0.75 moles) dimethyl terephthalate
89.0 g (1.44 moles) ethylene glycol
32.8 g (0.23 moles) 1,4-cyclohexanedimethanol
50 ppm Mn, 250 ppm Sb, 30 ppm Ti, 70 ppm P
100 ppm red dye, 1,5-bis[[[4-hydroxymethyl)cyclohexyl]-methyl]amino]anthraquinone The above reactants, with the exception of P, were added to a 500-ml round bottom flask fitted with a stirrer, condensate take-off, and nitrogen inlet head. The flask and contents were immersed in a Wood's metal bath at approximately 170° C. The temperature was raised to 195° C. and maintained for two hours and 20 minutes while ester exchange of the dimethyl terephthalate, ethylene glycol, 1,4-cyclohexanedimethanol, and 1,5bis[[[4-(hydroxymethyl)cyclohexyl]methyl]amino]anthraquinone took place. The temperature was then raised to 215° C. and maintained for one hour and 30 minutes to complete the ester exchange. The temperature was raised to 240° C. and the P added. The temperature was then raised to 285° C. At 285° C., the melt was placed under 0.10 mm vacuum and polymerization was continued for 45 minutes. The resulting polymer obtained in essentially 100% yield was brilliant red and had an inherent viscosity of 0.706 in phenol/tetrachloroethane solvent.

EXAMPLE 4

Preparation of Copolymer Containing Copolymerized Blue Dye.

This composition was the same as in Example 1 except 100 ppm of blue dye, 1,4-bis[[[4-(hydroxymethyl)cyclohexyl]methyl]amino]anthraquinone, was used. The ester exchange and polymerization conditions were the same as in Example 1 and the resulting polymer was dark blue and had an inherent viscosity of 0.742 in phenol/tetrachloroethane solvent.

EXAMPLE 5

Preparation of Green Polyester 145.5 g (0.75 moles) dimethyl terephthalate
93.0 g (1.50 moles) ethylene glycol
120 ppm Ti catalyst
800 ppm yellow dye 1,5-bis[[1-(2-hydroxyethyl)-1,2,4-triazol-3-yl]thio]anthraquinone
150 ppm phthalocyanine blue pigment
30 ppm red dye 1,5-bis[[[4-(hydroxymethyl)cyclohexyl]methyl]amino]anthraquinone The ester interchange and polymerization of this polymer were carried out as in Example 1. The resulting polymer was "Emerald Green" and had an inherent viscosity of 0.661 in phenol/tetrachloroethane solvent.

EXAMPLE 6

Preparation of Green Polyester

This example illustrates the utility of the invention in that the dye concentration shown in Example 3 can be reduced and essentially the same color and density of color obtained by the addition of iron oxide.

145.5 g (0.75 moles) dimethyl terephthalate
93.0 g (1.50 moles) ethylene glycol
120 ppm Ti catalyst
400 ppm yellow dye, 1,5-bis[[1-(2-hydroxyethyl)-1,2,4-triazol-3-yl]thio]anthraquinone
100 ppm phthalocyanine blue pigment
15 ppm red dye, 1,5bis[[[4-hydroxymethyl)cyclohexyl]methyl]amino]anthraquinone
200 ppm iron oxide BK-45 (Hoechst)

The ester exchange and polymerization of this polymer were carried out as described in Example 1. The resulting polymer was "Emerald Green," similar to the polymer produced in Example 3, and had an inherent viscosity of 0.732 in phenol/tetrachloroethane solvent.

EXAMPLE 7

Preparation of "Blue-White" Polyester

This example following Example 6 show that low concentrations of copolymerized red and blue dyes can be used to cover the yellow of the base polymer and give a polymer with a clear, "blue-white" appearance suitable for beverage bottle application.

145.50 g (0.75 moles) dimethyl terephthalate
93.00 g (1.50 moles) ethylene glycol
50 ppm Mn, 250 ppm Sb, 30 ppm Ti, 70 ppm P
7 ppm blue dye - 1,4-bis[[[4-(hydroxymethyl)cyclohexyl]-methyl]amino] anthraquinone The ester exchange and polymerization of this polymer was carried out as described in Example 1. The resulting polymer was a clear, "blue-white" and had an inherent viscosity of 0.624 in phenol/tetrachloroethane solvent.

EXAMPLE 8

Preparation of "Blue-White" Polyester 145.50 g (0.75 moles) dimethyl terephthalate
70.00 g (1.12 moles) ethylene glycol
32.80 g (0.23 moles) 1,4-cyclohexanedimethanol
55 ppm Mn, 50 ppm Ti, 100 ppm P, (catalysts)
7 ppm blue dye 1,4-bis[[[4-(hydroxymethyl)cyclohexyl]methyl]amino]anthraquinone
1 ppm red dye 1,5-bis[[[4-(hydroxymethyl)cyclohexyl]methyl]amino]anthraquinone The ester exchange and polymerization of this polymer was carried out as described in Example 1. The resulting polymer was clear, "blue-white", and had an inherent viscosity of 0.626 in phenol/tetrachloroethane solvent.

The useful types of polyesters, saturated and crosslinkable, are those disclosed for example in U.S. Pat. Nos. 2,465,319, 3,668,277; 3,560,445, and Br. 578,079. Among the useful polyesters are those produced from one or more diols such as 1,4-bis(hydroxymethyl)cyclohexane; ethylene glycol; 1,2-propanediol; 1,3-propanediol; 1,2-butanediol; 2,3-butanediol; 1,3-butanediol; 1,4-butanediol; 2,2-dimethyl-1,3-propanediol; 2,3-propanediol; 1,6-hexanediol; 2-ethylhexanediol; 1,2-cyclohexanediol; 1,4-cyclohexanediol; 1,2-bis(hydroxymethyl)cyclohexane; 1,3-bis-(hydroxymethyl)cyclohexane; x,8-bis-(hydroxymethyl)tricyclo-[5.2.1.0]-decane wherein x represents 3, 4 or 5; and diols containing one or more oxygen atoms in the chain, e.g., diethylene glycol, triethylene glycol, dipropylene glycol or tripropylene glycol. In general, these diols contain two to 18, preferably two to 12 carbon atoms. Cycloaliphatic diols can be employed in their cis or trans configuration or as a mixture of both forms.

The acids used to form the polyester component of, for example, molding or coating compositions may comprise one or more of a cyclic dicarboxylic acid and/or acyclic dicarboxylic acid. Examples of suitable aromatic and cycloaliphatic dicarboxylic acids are terephthalic acid, isophthalic acid, hexahydroterephthalic acid, tetrahydrophthalic acid, hexahydrophthalic acid, hexahydroisophthalic acid, as well as endomethylene- and endoethylene- tetrahydrophthalic acid, hexachloroendomethylenetetrahydrophthalic acid or tetrabromophthalic acid. The cycloaliphatic dicarboxylic acids can be employed in their trans or cis configuration or as a mixture of both forms. The use of dicarboxylic acids wherein the carboxyl groups are arranged in the 1,2- or in the 1,3- position is preferred. Especially preferred are those dicarboxylic acids wherein the carboxyl groups are arranged in the 1,2-position. Of these, phthalic acid and hexahydrophthalic acid are especially preferred. In general, the cyclic dicarboxylic acids contain eight to 12 carbon atoms, preferably eight to 10 carbon atoms. The carbocyclic dicarboxylic acids are preferred, especially the monocyclic carboxylic, e.g., wherein the ring is a benzene, cyclohexane or bridged cyclohexane ring. Also useful, for example, are succinic, glutaric, adipic, suberic, sebacic, decanedicarboxylic, 2,2,4-trimethyladipic acid, maleic, fumaric, itaconic and citraconic acids. In place of the cyclic and/or acyclic dicarboxylic acids themselves, it is possible and often preferable to use a functional acid derivative therof. For example, instead of the free dicarboxylic acids, esters thereof with lower-alkanols can also be employed, e.g., the dimethyl, diethyl or dipropyl ester. The anhydrides of the dicaroxylic acids can likewise be employed, e.g., phthalic anhydride, hexahydrophthalic anhydride, tetrahydrophthalic anhydride, succinic anhydride, glutaric anhydride and maleic anhydride.

The polyesters can be produced according to conventional processes, e.g., with or without a catalyst, with or without the introduction of an inert gas stream, as solution condensation in a solvent, as a melt condensation or azeotropic esterification, at temperatures of up to 250° C., or higher so that the water or alkanol produced by the esterification is continuously removed. The esterification takes place almost quantitatively and can be followed by measuring the hydroxyl and acid numbers. The esterification temperature may be selected so that the losses of readily volatile substances remain small, i.e., during at least the first period of the esterification, the process is conducted at a temperature below the boiling point of the lowest-boiling starting substance.

With regard to the unsaturated, curable, polyesters, these are the polyesterification products of one or more dihydric alcohols and one or more unsaturated dicarboxylic acids or their anhydrides, and the term "polyester resin" is used herein to define the unsaturated polyester dissolved in, or cross-linked with, an ethylenically unsaturated monomer. Typical is the polyesterification product of (a) 1,4-cyclohexane dimethanol and/or 2,2-dimethyl-1,3-propanediol and optionally an additional dihydric alcohol, such as ethylene glycol, and (b) maleic acid or fumaric acid or the anhydride or maleic acid, and an unsaturated hydrogenated aromatic dicarboxylic acid, which when crosslinked with an ethylenically-unsaturated monomer, e.g styrene, produces a polyester resin which has, for example, high thermal resistance, high heat distortion values, excellent electrical and mechanical properties, and excellent resistance to chemicals.

The unsaturated polyesters may be prepared in the presence of gelation inhibitors such as hydroquinone or the like, which are well known in the art of polyesterification. The esterification may be carried out for example under an inert blanket of gas such as nitrogen in a temperature range of 118°-220° C. for a period of about 6-20 hours until an acid number below 100 and preferably below 50 is obtained, based on milliequivalents of KOH necessary to neutralize 1 gram of the polyester. The resulting polyesters may be dissolved in and subsequently copolymerized with any of the well-known ethylenically unsaturated monomers used as solvents and copolymerizable monomers for polyesters. Examples of such monomers include styrene, alphamethyl styrene, vinyl toluene, divinyl benzene, chlorostyrene, and the like as well as mixtures thereof.

The unsaturated polyester may be prepared for example from one or more dihydric alcohols, fumaric or maleic acid or anhydride, and up to about 60 mole percent of total acid component of o-phthalic, isophthalic or terephthalic acids or anhydrides. Preferred for the dihydric alcohol component is one or more of propylene glycol, neopentyl glycol, 2,2,4-trimethyl-1,3-pentanediol, ethylene glycol, and diethylene glycol. A preferred unsaturated polyester is prepared from propylene glycol, and as the acid component, o-phthalic anhydride and maleic anhydride in a mole ratio of from about ½ to about 2/1.

The present anthraquinone dye components comprise coloring amounts, i.e., from about 1.0 to about 5,000 and preferably about 2.0 to about 1500 parts of each dye per million parts of polyester. The novel colored polymers of the present invention are linear thermoplastic or unsaturated cross-linkable polyesters, containing a coloring amount of the residue of one or more of the compounds of the formula

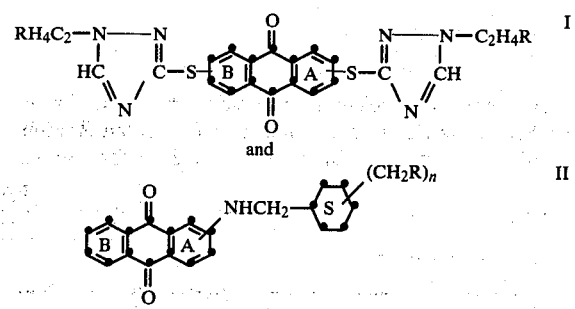

wherein R is —OH, —COOR$^1$ or —COX wherein R$^1$ is —H or lower alkyl, X is halogen, n is 1 or 2, either A or B of II must contain, and A or B of I may contain at least one additional

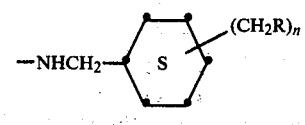

group, and rings A and B may be substituted with 1-3 groups selected from lower alkyl, which may be substituted with lower alkoxy, phenyl, Cl, Br, and lower alkanoylamino; lower alkoxy which may be substituted with lower alkoxy, phenyl, Cl, Br, and lower alkanoylamino; chlorine; bromine; amino; lower alkyl amino which may be substituted with lower alkoxy, phenyl, Cl, Br, and lower alkanoylamino; aryl amino; arylthio; and aroylamino; wherein each aryl is 6-10 carbons and preferably phenyl in each case; lower alkylsulfonyl; lower alkylthio; lower alkanoylamino; cyclohexylamino and the like.

The preferred novel colored polymers of the present invention are defined as linear thermoplastic polyesters having an I.V. of from about 0.4 to about 0.8, the acid moiety of which comprises at least about 50 mole percent terephthalic acid residue, and the glycol moiety of which comprises at least about 50 mole percent ethylene glycol or 1,4-cyclohexanediol residue, and containing from about 2.0 to about 1500 parts per million of one or more copolymerized dyes of the formulae

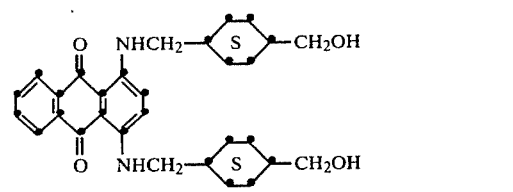

blue

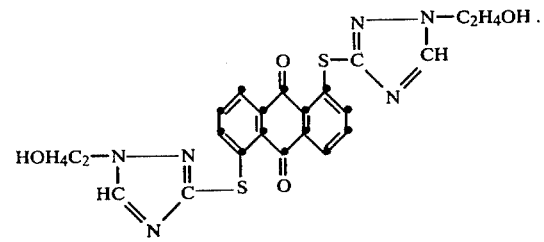

, and red yellow

A preferred polyester is prepared from dimethyl terephthalate, ethylene glycol, and from 0 to about 30 mole % of 1,4-cyclohexanedimethanol based on total moles of glycol, containing from about 2.0 to about 1500 parts of any or all of the above three dyes per one million parts of polyester.

The following table gives dyes useful in practicing the present invention.

TABLE 1

| | Derivatives of Dyes I and II Above | |
|---|---|---|
| Example No. | Substituents on Ring A | Substituents on Ring B |
| 9 | 1,4-di-NHCH₂–[S]–CH₂OH | 6-CH₃ |
| 10 | 1-NHCH₂–[S]–CH₂OH | 5-NHCH₂–[S]–CH₂OH |
| 11 | 1-NHCH₂–[S(CH₂OH)] | 5-NHCH₂–[S(CH₂OH)] |
| 12 | 2-NHCH₂–[S]–CH₂OH | 6-NHCH₂–[S]–CH₂OH |
| 13 | 1-NHCH₂–[S]–CH₂OH | 8-NHCH₂–[S]–CH₂OH |
| 14 | 1-NHCH₂–[S]–CH₂OH, 4-Br | 8-NHCH₂–[S]–CH₂OH, 5-Br |
| 15 | 1-NHCH₂–[S]–CH₂OH, 4-NH₂ | 8-NHCH₂–[S]–CH₂OH, 5-NH₂ |
| 16 | 1-NHCH₂–[S]–CH₂OH, 4-NHCH₃ | 8-NHCH₂–[S]–CH₂OH, 5-NHCH₃ |
| 17 | 1-NHCH₂–[S]–CH₂OH, 4-NH–[S] | 8-NHCH₂–[S]–CH₂OH, 5-NH–[S] |
| 18 | 1-NHCH₂–[S]–CH₂OH, 4-NH–[phenyl] | 8-NHCH₂–[S]–CH₂OH, 5-NH–[phenyl] |
| 19 | 1-NHCH₂–[S]–CH₂OH, 4-NH–[phenyl-CH₃] | 8-NHCH₂–[S]–CH₂OH, 5-NH–[phenyl-CH₃] |

TABLE 1-continued

Derivatives of Dyes I and II Above

| Example No. | Substituents on Ring A | Substituents on Ring B |
|---|---|---|
| 20 | 1-NHCH₂-[S]-CH₂OH, 4-NH-[C₆H₃]-Cl | 8-NHCH₂-[S]-CH₂OH, 5-NH-[C₆H₃]-Cl |
| 21 | 1-NHCH₂-[S]-CH₂OH, 4-NHCH₂-[C₆H₅] | 8-NHCH₂-[S]-CH₂OH, 5-NHCH₂-[C₆H₅] |
| 22 | 1-NHCH₂-[S]-CH₂OH, 4-NHC₂H₄OCH₃ | 8-NHCH₂-[S]-CH₂OH, 5-NHC₂H₄OCH₃ |
| 23 | 1-NHCH₂-[S]-CH₂OH, 4-NHCH₂-[S] | 8-NHCH₂-[S]-CH₂OH, 5-NHCH₂-[S] |
| 24 | 1-NHCH₂-[S]-CH₂OH, 4-NHCH₂-[C₆H₅] | None |
| 25 | 1-NHCH₂-[S]-CH₂OH, 4-SC₂H₅ | 5-NHCH₂-[S]-CH₂OH, 8-SCH₃ |
| 26 | 1-NHCH₂-[S]-CH₂OH, 4-OCH₃ | None |
| 27 | 1-NHCH₂-[S], 4-S-[C₆H₄]-C(CH₃)₃, CH₂OH | 5-NHCH₂-[S], 8-S-[C₆H₄]-C(CH₃)₃, CH₂OH |
| 28 | 1-NHCH₂-[S]-CH₂OH, 4-SO₂CH₃ | 5-NHCH₂-[S]-CH₂OH, 8-SO₂CH₃ |
| 29 | 1,4-di-NHCH₂-[S]-CH₂OH, 2-Br | None |
| 30 | 1,4-di-NHCH₂-[S]-CH₂OH, 2-OC₆H₅ | None |
| 31 | 1,4-di-NHCH₂-[S]-CH₂OH, 2-SO₂C₂H₅ | None |
| 32 | 1,4-di-NHCH₂-[S]-CH₂OH, 2,3-di-Cl | None |
| 33 | 2-NHCH₂-[S]-CH₂OH, 1-Br | 6-NHCH₂-[S]-CH₂OH, 5-Br |
| 34 | 1-NHCH₂-[S]-CH₂OH | 5-NHCH₂-[S]-CH₂OH  and  8-NHCH₂-[S]-CH₂OH  } 50:50 Mixture |
| 35 | 1,4-di-NHCH₂-[S]-CH₂OH | 6-C₂H₄Cl |
| 36 | 1-NHCH₂-[S], 4-C₂H₄OCH₃, CH₂OH | 5-NHCH₂-[S], CH₂OH |
| 37 | 1-NHCH₂-[S], 4-OC₂H₄OC₂H₅, CH₂OH (CH₂OH) | 5-NHCH₂-[S], CH₂OH (CH₂OH) |
| 38 | 1-NHCH₂-[S]-CH₂OH, 2-C₂H₄NHCOCH₃ | 6-NHCH₂-[S]-CH₂OH |
| 39 | 1-NHCH₂-[S]-CH₂OH, 2-CH₂-C₆H₅ | 8-NHCH₂-[S]-CH₂OH |

TABLE 1-continued
Derivatives of Dyes I and II Above

| Example No. | Substituents on Ring A | Substituents on Ring B |
|---|---|---|
| 40 | 1-NHCH₂—⟨S⟩—CH₂OH, 4-OCH₂CH₂Cl | 8-NHCH₂—⟨S⟩—CH₂OH, 5-OCH₂CH₂Cl |
| 41 | 1-NHCH₂—⟨S⟩—CH₂OH, 4-OCH₂CH₂NHCOCH₃ | 8-NHCH₂—⟨S⟩—CH₂OH, 5-OCH₂CH₂NHCOCH₃ |
| 42 | 1-NHCH₂—⟨S⟩—CH₂OH, 4-OCH₂C₆H₅ | 8-NHCH₂—⟨S⟩—CH₂OH, 5-OCH₂C₆H₅ |
| 43 | 1-NHCH₂—⟨S⟩—CH₂OH, 4-H—NHC₂H₄Ph | 8-NHCH₂—⟨S⟩—CH₂OH, 5-NH—C₂H₄Ph |
| 44 | 1-NHCH₂—⟨S⟩—CH₂OH, 4-H—NHCOCH₃ | 8-NHCH₂—⟨S⟩—CH₂OH, 5-NH—COCH₃ |
| 45 | 1-NHCH₂—⟨S⟩—CH₂OH, 4-NH—⟨C₆H₄⟩—CH₃ | 8-NHCH₂—⟨S⟩—CH₂OH, 5-NH—⟨C₆H₄⟩—CH₃ |
| 46 | 1-NHCH₂—⟨S⟩—CH₂OH, 4-NH—⟨C₆H₃⟩(Cl)(Cl) | 8-NHCH₂—⟨S⟩—CH₂OH, 5-NH—⟨C₆H₃⟩(Cl)(Cl) |
| 47 | 1-NHCH₂—⟨S⟩—CH₂OH, 4-NHCH₂—⟨C₆H₅⟩ | 8-NHCH₂—⟨S⟩—CH₂OH, 5-NHCH₂—⟨C₆H₅⟩ |

The invention has been described in detail with particular reference to preferred embodiments thereof, but it will be understood that variations and modifications can be effected within the spirit and scope of the invention.

We claim:

1. Colored polymeric material comprising a linear thermoplastic or unsaturated cross-linkable polyester, containing a coloring amount of one or more copolyesterifide compounds of the formula

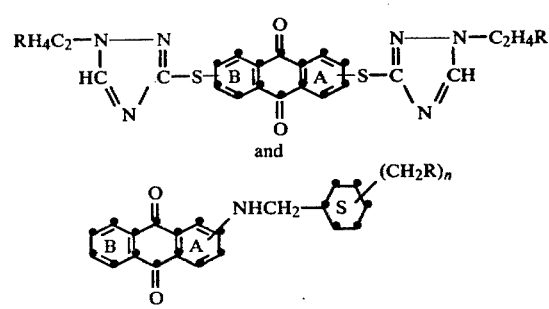

and

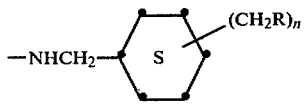

wherein R is —OH, —COOR¹ or —COX wherein R¹ is —H or lower alkyl, X is halogen, n is 1 or 2, either A or B of II must contain, and A or B of I may contain, at least one additional

—NHCH₂—⟨S⟩—(CH₂R)ₙ group, each of rings A and B may be further substituted with 1-3 radicals selected from lower alkyl which may be substituted with lower alkoxy, phenyl, Cl, Br, and lower alkanoylamino; lower alkoxy which may be substituted with lower alkoxy, phenyl, Cl, Br, and lower alkanoylamino; chlorine; bromine; amino; lower alkyl amino which may be substituted with lower alkoxy, cyclohexyl, phenyl, Cl, Br, and lower alkanoylamino; aryl amino; arylthio; and aroylamino; wherein each aryl is 6-10 carbons; lower alkylsulfonyl; lower alkylthio; lower alkanoylamino; and cyclohexylamino.

2. The colored polymeric material of claim 1 wherein one or more of the coloring compounds are each present in concentrations of from about 1.0 to about 5,000 parts per million of polyester, and said compounds have the formulae

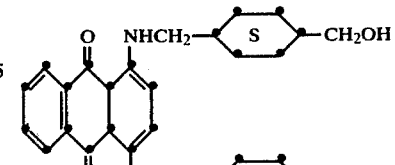

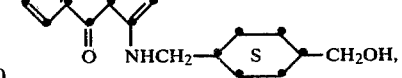

, and

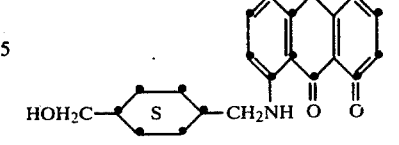

-continued

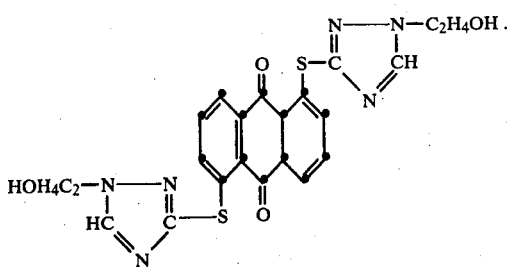

3. The colored polymeric material of claim 2 wherein the polyester is prepared from dimethyl terephthalate, ethylene glycol, and from 0 to about 30 mole % of 1,4-cyclohexanedimethanol based on total moles of glycol, and each of the coloring compounds are present in reacted form in concentrations of from about 2.0 to about 1500 parts per million parts of polyester.

4. The colored polymeric material of claim 1 wherein the polyester is unsaturated and is prepared from one or more dihydric alcohols, fumaric or maleic acid or anhydride, and up to about 60 mole percent of total acid component of one or a mixture of o-phthalic, isophthalic or terephthalic, and the coloring compounds are present in reacted form in concentrations of from about 2.0 to about 1500 parts per million parts of polyester.

5. The colored polymeric material of claim 4 wherein the dihydric alcohol component is one or more of propylene glycol, neopentyl glycol, 2,2,4-trimethyl-1,3-pentanediol, ethylene glycol, and diethylene glycol.

6. The material of claim 5 wherein the dihydric alcohol is propylene glycol and the acid component is o-phthalic anhydride and maleic anhdride in a mole ratio of from about ½ to about 2/1.

* * * * *

UNITED STATES PATENT AND TRADEMARK OFFICE
CERTIFICATE OF CORRECTION

PATENT NO. : 4,267,306
DATED : May 12, 1981
INVENTOR(S) : Thomas G. Davis and Max A. Weaver It is certified that error appears in the above—identified patent and that said Letters Patent is hereby corrected as shown below:

The title should read

---POLYESTER POLYMERS CONTAINING RESIDUES OF ANTHRAQUINONE DYES---

Column 12, lines 52-70, the formulae should read

---

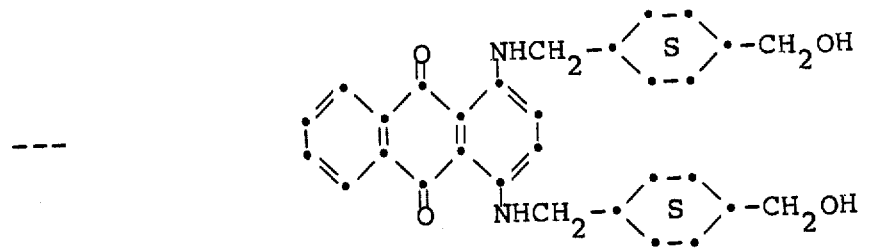

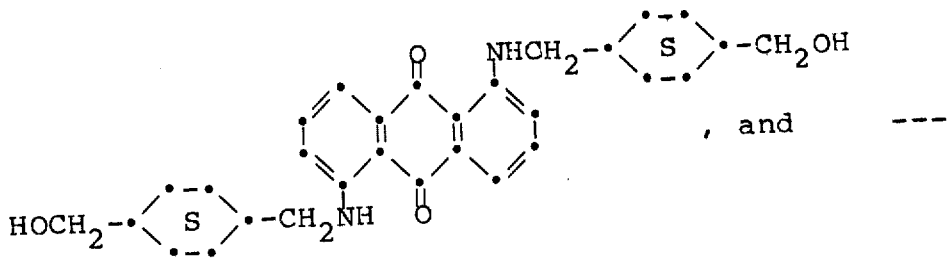

, and ---

UNITED STATES PATENT AND TRADEMARK OFFICE
CERTIFICATE OF CORRECTION

PATENT NO. : 4,267,306
DATED : May 12, 1981
INVENTOR(S) : Thomas G. Davis and Max A. Weaver It is certified that error appears in the above—identified patent and that said Letters Patent is hereby corrected as shown below:

Column 13, lines 1-13, the formula should read

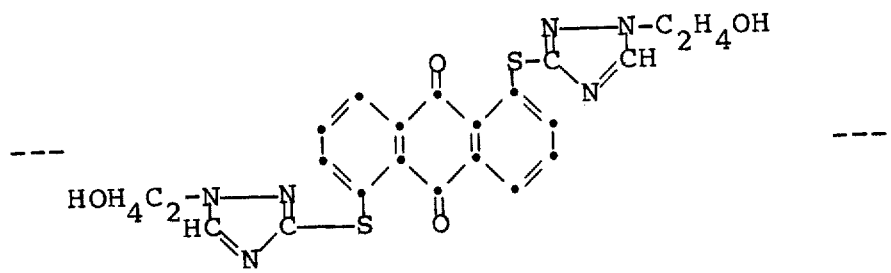

Column 14, line 18, "anhdride" should read ---anhydride---.

Signed and Sealed this

First Day of November 1983

[SEAL]

Attest:

GERALD J. MOSSINGHOFF

Attesting Officer   Commissioner of Patents and Trademarks